US010503047B2

(12) United States Patent
Cubukcu et al.

(10) Patent No.: US 10,503,047 B2
(45) Date of Patent: Dec. 10, 2019

(54) OPTOMECHANICAL DOUBLY RESONANT 2D FREQUENCY DOUBLING DEVICES (71) Applicant: The Trustees of the University of Pennsylvania, Philadelphia, PA (US)

(72) Inventors: Ertugrul Cubukcu, Philadelphia, PA (US); Fei Yi, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/580,537

(22) PCT Filed: Jun. 9, 2016

(86) PCT No.: PCT/US2016/036673
§ 371 (c)(1),
(2) Date: Dec. 7, 2017

(87) PCT Pub. No.: WO2016/201090
PCT Pub. Date: Dec. 15, 2016

(65) Prior Publication Data
US 2018/0246392 A1 Aug. 30, 2018

Related U.S. Application Data (60) Provisional application No. 62/173,023, filed on Jun. 9, 2015.

(51) Int. Cl.
*G02F 1/35* (2006.01)
*G02F 1/355* (2006.01)
(Continued)

(52) U.S. Cl.
CPC ......... *G02F 1/3501* (2013.01); *G02B 26/002* (2013.01); *G02F 1/355* (2013.01);
(Continued)

(58) Field of Classification Search
CPC ........................... G02F 1/3501; G02B 26/002
See application file for complete search history.

(56) References Cited

U.S. PATENT DOCUMENTS 5,739,945 A * 4/1998 Tayebati .............. G02B 26/001
257/419
5,870,221 A 2/1999 Goossen
(Continued)

OTHER PUBLICATIONS

International Preliminary Report on Patentability for International Application No. PCT/US2016/036673, dated Dec. 12, 2017, 6 pages.
(Continued)

*Primary Examiner* — Rhonda S Peace
(74) *Attorney, Agent, or Firm* — BakerHostetler (57) ABSTRACT

Optomechanical device for frequency doubling enhancement are described. The devices include a substrate through which light of a first wavelength is introduced, a first reflector mirror, a conductive layer disposed on the first reflector mirror, and a second mirror spaced apart from the conductive layer, thereby forming an optical cavity between the second mirror and the conductive layer. The devices also include a power source coupled to the second mirror and the conductive layer and a monolayer of non-linear optical material disposed within the optical cavity, the monolayer being configured to produce light of a second wavelength upon interaction with the light of the first wavelength. The second mirror is deformable upon introduction of voltage from the power source and deformation of the second mirror changes a length of the optical cavity, thereby enhancing a power output of the light of the second wavelength produced by the monolayer.

14 Claims, 6 Drawing Sheets (51) Int. Cl.
*G02B 26/00* (2006.01)
*G02F 1/361* (2006.01)
*G02F 1/37* (2006.01)

(52) U.S. Cl.
CPC .............. *G02F 1/3613* (2013.01); *G02F 1/37* (2013.01); *G02F 2201/346* (2013.01); *G02F 2203/15* (2013.01)

(56) References Cited

U.S. PATENT DOCUMENTS

| | | | | |
|---|---|---|---|---|
| 6,069,903 | A * | 5/2000 | Zanger | G02F 1/37 372/107 |
| 6,324,192 | B1 * | 11/2001 | Tayebati | G02B 26/001 372/20 |
| 6,645,784 | B2 * | 11/2003 | Tayebati | G01J 3/26 438/22 |
| 8,644,648 | B2 * | 2/2014 | Ho | G02F 1/065 385/2 |
| 8,654,801 | B2 * | 2/2014 | Oto | G02F 1/37 372/20 |
| 9,170,157 | B2 * | 10/2015 | Hirokubo | G01J 3/26 |
| 9,568,752 | B2 * | 2/2017 | Ho | G02F 1/065 |
| 2006/0055920 | A1 | 3/2006 | Wang et al. | |
| 2008/0186494 | A1 | 8/2008 | Kiesel et al. | |
| 2012/0020085 | A1 | 1/2012 | Ikeda et al. | |
| 2012/0200851 | A1 * | 8/2012 | Wu | G01N 21/658 356/301 |
| 2014/0210836 | A1 * | 7/2014 | Zhong | G02B 26/0841 345/530 |
| 2018/0246392 | A1 * | 8/2018 | Cubukcu | G02F 1/355 |

OTHER PUBLICATIONS

Reed et al., "Wavelength Tunable Microdisk Cavity Light Source with a Chemically Enhanced MoS2 Emitter", Nano Letters, 2015, vol. 15, pp. 1967-1971.
International Search Report and Written Opinion of the International Searching Authority for International Application No. PCT/US2016/036673, dated Sep. 27, 2016, 7 pages.

* cited by examiner

OPTOMECHANICAL DOUBLY RESONANT 2D FREQUENCY DOUBLING DEVICES

CROSS REFERENCE TO RELATED APPLICATIONS

This application is a U.S. national phase application of International Application No. PCT/US2016/036673, filed Jun. 9, 2016 which claims priority to U.S. Provisional application Ser. No. 62/173,023 entitled OPTOMECHANICAL DOUBLY RESONANT 2D FREQUENCY DOUBLING DEVICES filed on Jun. 9, 2015, the contents of which are incorporated fully herein by reference.

GOVERNMENT RIGHTS

This invention was made with government support under grant number DMR1120901 awarded by the National Science Foundation. The government has certain rights in the invention.

FIELD OF THE INVENTION

The present invention relates to devices for second harmonic wave generation and enhancement.

BACKGROUND OF THE INVENTION

Non-linear optical materials have made possible wavelength tunable coherent light sources important in various applications extending from bio-imaging to laser machining. Second harmonic wave generation is an example of these applications. There is a need for efficient and effective enhancement of second harmonic wave generation and devices capable of doing so.

SUMMARY OF THE INVENTION

Aspects of the invention include optomechanical devices for frequency doubling enhancement. The devices include a substrate through which light of a first wavelength is introduced, a first reflector mirror positioned on the substrate, a conductive layer disposed on the first reflector mirror, a second mirror spaced apart from the conductive layer, thereby forming an optical cavity between the second mirror and the conductive layer, a power source coupled to the second mirror and the conductive layer, and a monolayer of non-linear optical material disposed within the optical cavity, the monolayer configured to produce light of a second wavelength upon interaction with the light of the first wavelength. The second mirror is configured to be deformable upon introduction of voltage from the power source and wherein deformation of the second mirror changes a length of the optical cavity, thereby enhancing a power output of the light of the second wavelength produced by the monolayer.

Further aspects of the invention include methods for optomechanically enhancing frequency doubled light. The methods include introducing light of a first wavelength through a substrate and through a first reflector mirror, passing the light of the first wavelength through a conductive layer and into an optical cavity formed by a space between the conductive layer and a second deformable mirror, reflecting the light of the first wavelength in the optical cavity to a monolayer of non-linear optical material disposed within the cavity, thereby producing light of a second wavelength, deforming the second mirror by applying a voltage to the second mirror, thereby changing a length of the optical cavity, thereby resonantly enhancing a power output of the light of the second wavelength, and outputting the light of the second wavelength.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures.

DETAILED DESCRIPTION OF THE INVENTION

Using photonic structures to resonantly control and enhance interaction of light with monolayers of non-linear optical materials appears to be a logical step for their use in optoelectronics applications. To maximize the enhancement of second harmonic generation (SHG), the nonlinear nature of the light matter interaction necessitates a doubly resonant optical cavity scheme, where both the fundamental wave (FW) and the second-harmonic wave (SHW) are simultaneously resonant. This double resonance scheme requires delicate on-chip reconfiguration of the cavity modes reminiscent of phase matching in bulk crystals. Thus, an integrated optomechanical frequency doubling device with a chemical vapor deposition (CVD) grown monolayer of non-linear optical materials as the active nonlinear material is disclosed herein. This micro-electro-mechanical system (MEMS) enabled optical device can be electrostatically reconfigured to enhance nonlinear light generation by more than three orders of magnitude. The device is based on a voltage controlled widely tunable micro-Fabry-Perot (FP) cavity that includes a spectrally selective dielectric distributed Bragg reflector (DBR) mirror and a voltage deformable silver mirror fabricated on a silicon nitride membrane.

Figure 1A:
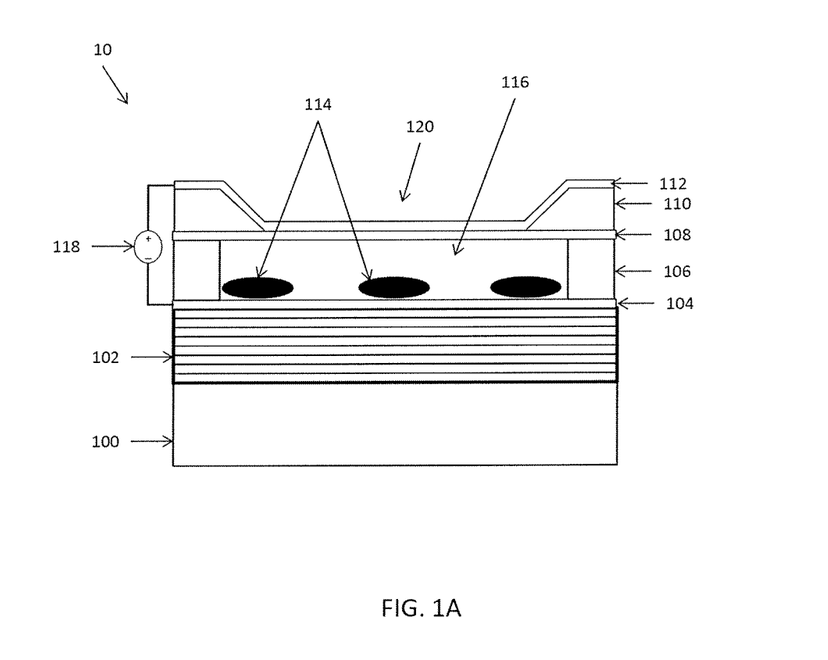
FIGS. 1A and 1B are diagrams of an optomechanical device according to aspects of the invention.
Figure 1B:
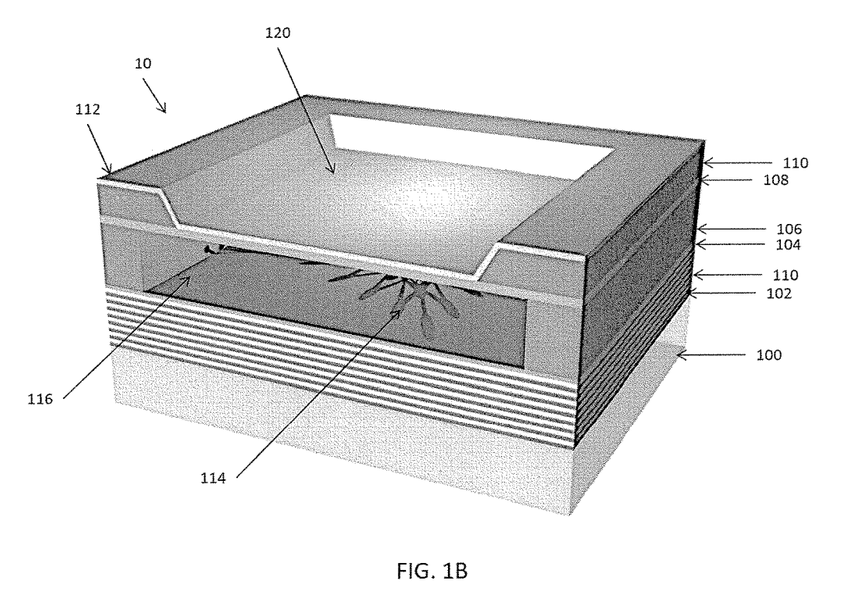

Referring to FIGS. 1A and 1B generally, an optomechanical second harmonic generation enhancing device 10 is shown. The device 10 includes a substrate 100, a first reflector mirror 102, a conductive layer 104, and a second deformable mirror 112. The device 10 also includes a photoresist spacer 106. A window 110 is bonded to the spacer 106 via a suspended membrane 108, such that the second mirror 112 is mechanically supported by the suspended membrane 108 is formed over the window 108, thereby creating a recessed portion 120 of the second mirror 112. An optical cavity 116 is formed between the conductive layer 104 and the second mirror 112 by way of the spacer 106. Disposed within the optical cavity 116 is at least one monolayer 114 of non-linear optical material. A power source 118 is coupled between the conductive layer 104 and the second mirror 112 for supplying a voltage to the second mirror 112.

With reference to the specific components of the device 10, in one embodiment, the substrate 100 is configured to receive light from an external source (not shown) and pass the light through to the other components of the device 10. Thus, the substrate 100 is preferably transparent. The substrate may be constructed of glass, or other transparent materials capable of passing light and supporting the structure of the remaining components of the device 10, as will be understood by those of ordinary skill in the art from the description herein.

Light from the external source passes through the substrate 100 into the first reflector mirror 102. In one embodiment, the first mirror 102 is a spectrally selective dielectric distributed Bragg reflector (DBR). The first mirror 102 may include multiple pairs of silicon-nitride (SiNx) and silicon-oxide (SiOx) layers, as will be understood to one of skill in the art. The SiNx and SiOx layers may be of suitable thickness, such as about 130 nm thick.

A conductive layer 104 is positioned at the end of the first mirror 102. The conductive layer 104 may be disposed over the end of the first mirror 102 or embedded in the first mirror 102. In one embodiment, the conductive layer 104 is constructed of an indium tin oxide (ITO) compound. The conductive layer 104 acts as a transparent electrode which may be coupled to the deformable second mirror 112 via the power source 118.

A pair of photoresist spacers 106 are deposited on the conductive layer 104. The photoresist spacers 106 may be constructed of SU-8 material, or other suitable materials that will be understood to those of skill in the art from the description herein.

A window 110 is formed over the spacers 106 and positioned at a distance from the conductive layer 104. The window 110 may be constructed of a silicon based material, such as silicon, silicon-nitride, etc. In one embodiment, the window 110 may be a membrane of about 100 nm thickness. In one embodiment, the window 110 is bonded to the spacers 106 via an adhesive layer (not shown). The adhesive layer may include commercially available adhesive, such as cyanoacrylate.

Deposited on top of the window 110 is a second, deformable mirror 112. In one embodiment, the second deformable mirror 112 is constructed of silver and is a layer about 50 nm thick. The second mirror 112 is deformable in response to a voltage supplied by the power source 118, which is coupled to the second mirror 112 and the conductive layer 104. The positioning of the second mirror 112 over the shaped window 110 creates a recess 120. The suspended membrane 108 is positioned to mechanically support the deformable mirror 112. In one embodiment, the suspended membrane 108 is a nitride membrane.

The positioning of the conductive layer 104, the spacers 106 and the window 110 forms an optical cavity 116 between the first mirror 102 and the second mirror 112. The length of the optical cavity 116 in a rest state is approximately the distance between the end of the first mirror 102 (e.g., the conductive layer).

Within the optical cavity 116 are deposited monolayers 114 of non-linear optical materials. In one embodiment, the non-linear optical materials 114 include monolayers 114 of molybdenum disulfide (MoS2). Monolayers of MoS2 that lack inversion symmetry have large second order nonlinear optical response. As used herein, a "monolayer" refers to a layer that is of a thickness of the molecule which makes up the monolayer (e.g., a 2D layer). One or more monolayers 114 may be utilized. The monolayers 114 are deposited on the back side of the first mirror 102, or on the conductive layer 104.

Figure 2:
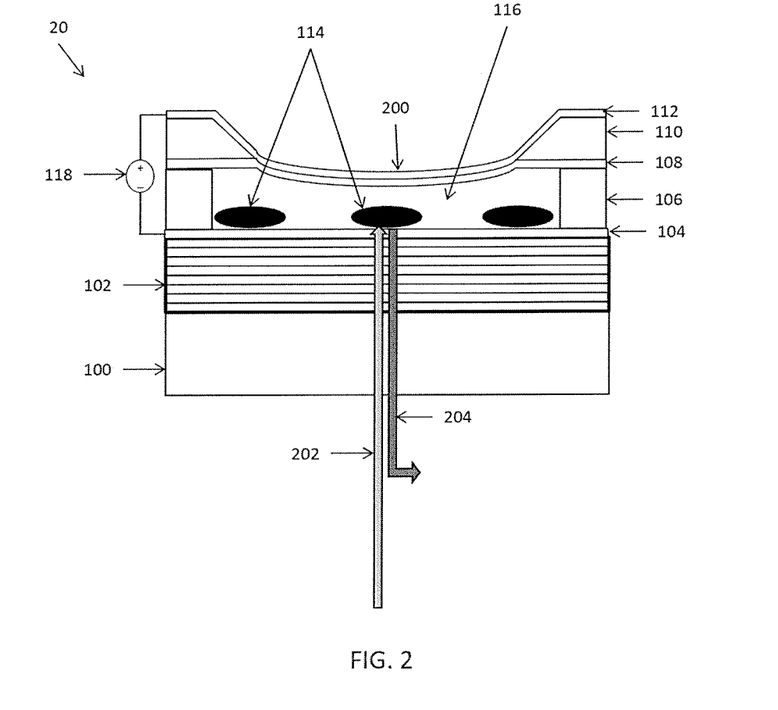
FIG. 2 is a diagram of an optomechanical device in use according to aspects of the invention.

With reference to FIG. 2, the optomechanical device 20 utilizing deformation is depicted. In use, light of a first wavelength 202 is introduced into the device 20 via the substrate 100. The light of the first wavelength 202 passes through the first mirror 102, the conductive layer 104, and into the cavity 116 that houses the monolayers 114. In response to receiving the light of the first wavelength 202, the monolayers 114 interact with the light 202 and produce a second harmonic generation of light of a second wavelength 204. The second light 204 has a frequency that is about double the first light 202 (e.g., blue light could the result of the second harmonic generation from red light being the first light.

Suitable enhancement of the second light 204 is desirable. Thus, the device 20 is constructed to be optomechanically tunable. When a voltage is introduced from the power source 118 that is coupled to the conductive layer 104 and the second mirror 112, a physical deformation of the second mirror 112 (as well as the suspended membrane 108) is caused, as is represented by the deformation 200. Thus, by introducing a voltage to the second mirror 112, the second mirror 112 can be deformed, which alters the length of the optical cavity 116. Alteration of the length of the optical cavity greatly enhances the power output of the light of the second wavelength 204.

Particular calculations are discussed below. Although the monolayer 114 of non-linear optical materials is referred to as an MoS2 layer, other suitable materials for the monolayer will be understood by one of skill in the art from the description herein.

Figures 3A, 3B:
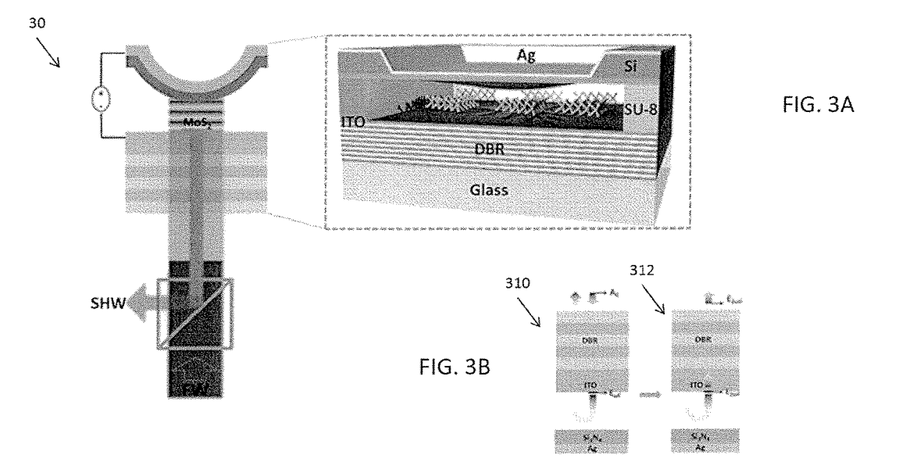
FIGS. 3A and 3B are schematics of an optomechanical device in accordance with aspects of the invention.

FIG. 3A is a schematic 300 of the device structure formed by the dielectric mirror on a glass substrate and a silver mirror on a suspended membrane. The silver mirror on suspended nitride membrane can be deformed by electrostatic force across the silver layer and the ITO layer, enabling the reconfiguration of the cavity. FW: Fundamental Wave; SHW: Second Harmonic Wave. FIG. 3B shows multilayer stack models used to calculate the cavity enhancement of the fundamental wave excitation (model 310) and the second harmonic wave output (model 312).

Figure 3C:
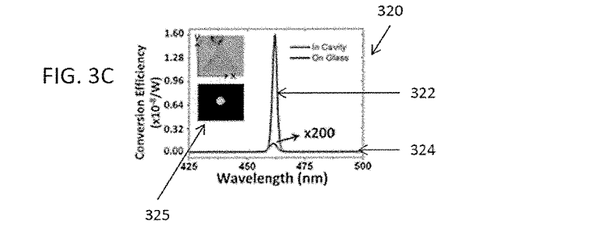
FIG. 3C is a graph showing conversion efficiency of optomechanical devices according to aspects of the invention.

FIG. 3C is a graph 320 showing second harmonic output. The second harmonic wave signal generated from the $MoS_2$ flake inside the cavity (line 322) and the $MoS_2$ flake on a glass substrate (line 324) flake. Here the wavelength is 925 nm and the tuning voltage is 20 V. The insets show the spot of the second harmonic wave generated from the $MoS_2$ flakes in the cavity under bright (top) and dark (bottom) fields. The x-axis is defined along one of triangle sides of a CVD grown $MoS_2$, which is the Zigzag direction. Therefore, the nonzero nonlinear coefficients are, $X^{(2)}=X_{yyy}^{(2)}=-X_{yxx}^{(2)}=-X_{xyx}^{(2)}$.

FIGS. 4A-4D are charts 400, 402, 404, and 406 showing voltage tuning of the cavity resonances. Voltage dependence of the spectral reflectance near the input fundamental (chart 400) and output second harmonic frequencies (chart 402) measured at the center of the device. The two FP cavity modes near the fundamental pump frequency region are labeled as $M_1$ and $M_2$. Point 410 indicates a region where a double resonance is expected. The simulated voltage dependence of the power enhancement factors for the fundamental and the second harmonic waves are shown in charts 404 and 406, respectively.

FIGS. 5A-5D are graphs 500, 502, 504, and 506 showing doubly resonant second harmonic generation measurements. Graph 500 shows the measured voltage dependence of the total output SHG power enhancement factor normalized to a monolayer on glass substrate. Graph 502 shows the voltage dependence of the peak FP resonance wavelengths in the fundamental (lines 510 and 512) and the corresponding second harmonic (lines 514 and 512) wave regions. The crossing points in the oval between lines 510 and 514 indicate a double resonance region.

Figures 5A, 5C:
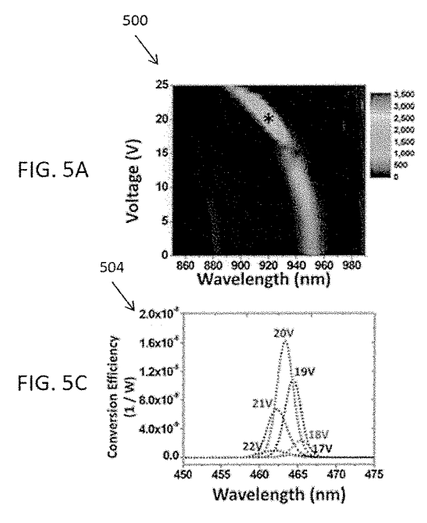
FIG. 5C is a graph showing optical spectrum evolution as a function of tuning voltage in accordance with aspects of the invention.
Figures 5B, 5D:
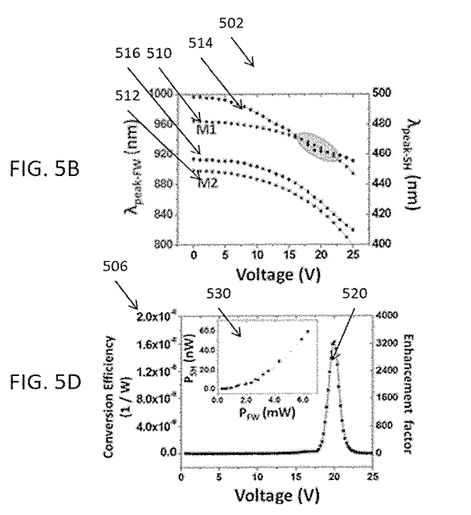
FIG. 5B is a graph showing voltage dependence of resonant wavelengths according to aspects of the invention.
FIG. 5D is a graph showing enhancement factor of a second harmonic generation in accordance with aspects of the invention.

Graph 504 shows the evolution of the optical spectrum of the second harmonic wave as a function of the tuning voltage. The output peak wavelength is tunable due to the resonances narrower than the spectral pulse width of the fundamental wave fixed at 930 nm. Graph 506 shows the measured voltage dependence of the total power enhancement factor and the power conversion efficiency for a pump wavelength of 930 nm. The inset shows the measured input power dependence of the output SHG signal. The line 520 shows a peak power enhancement factor of about 3300 at a voltage of about 20 V.

The nonlinear light-matter interaction is engineered by optomechanical tuning of the FP cavity length. This in turn controls the intra-cavity optical field strengths on the $MoS_2$ monolayer integrated directly on the DBR mirror 102 designed to be highly reflective in the fundamental and second harmonic wave regions. The transparency window between these two regions allows the triangular $MoS_2$ monolayer crystals to be clearly identified from the backside of the glass substrate under the optical microscope (inset 325 in FIG. 3C). The length of integrated FP cavity 116 can be reconfigured by applying a voltage between the metal coated free-standing top mirror 112 and the ITO layer 104 embedded in the DBR mirror 102 as a transparent electrode. The line 322 in FIG. 3C shows the measured SH output intensity generated by the $MOS_2$ monolayer inside the doubly resonant cavity. The line 324 shows the reference SH signal generated from a monolayer $MoS_2$ flake on a glass substrate. Based on this configuration, a very bright spot of SHW (~462 nm) was observed from an individual $MOS_2$ monolayer which stood inside the cavity and was excited by FW at 925 nm (inset 325 of FIG. 3C). The normalized conversion efficiency is measured to be $1.62 \times 10^{-8}$/W (line 322 of FIG. 3C), which is >5000 times larger than previous devices and ~3300 times stronger than that from a typical $MOS_2$ monolayer on glass (e.g., line 324). Moreover, the narrower SHG peak observed in the cavity 116 than on glass is ascribed to the cavity modulation.

Figure 4A:
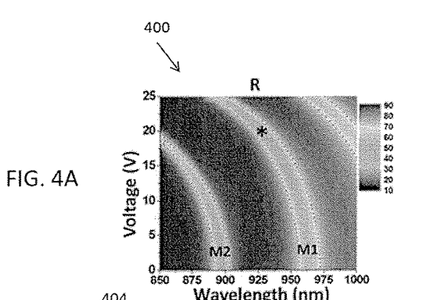
FIGS. 4A, 4B, 4C, 4D, and 5A are graphs showing voltage tuning of cavities in optomechanical devices in accordance with aspects of the invention.
Figure 4B:
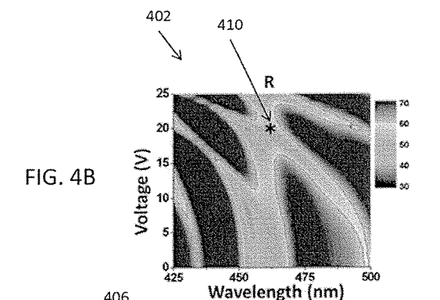

The linear optical response of FP cavity was measured under different tuning voltages to determine spectral position of the resonance modes. FIGS. 4A and 4B show plots 400 and 402 of the voltage dependence of spectral reflectance at the center of the device near fundamental wave and SH wave regions, respectively. It can be seen that the resonant wavelengths of the two optical modes in the fundamental wave region (marked as M1 and M2 in FIG. 4A) are blue-shifted due to the decreasing cavity length by electrostatic deflection of the deformable membrane mirror.

With a tuning voltage of 25 V corresponding to a 535 nm change in cavity length, M1 resonance wavelength blue-shifts by 70 nm. From this blueshift, the corresponding cavity length reduction, i.e. mechanical deflection of the membrane, was determined by matching the measured data with the optical transfer matrix method (TMM) calculations.

Figure 4C:
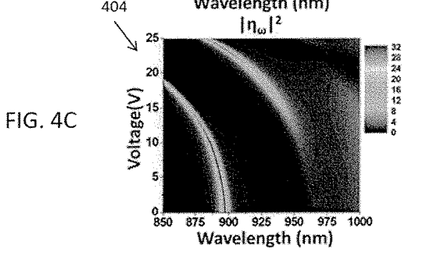

The near-field strength in the cavity was also estimated to determine the nonlinear response. It is assumed that the complex amplitude of the radiated second harmonic wave from a nonlinear monolayer flake $S_F(2\omega)$ in response to a harmonic electric field of angular frequency co and complex amplitude $E_F(\omega)$ is given by: $S_F(2\omega) = \eta_F \times E_F(\omega) \times E_F(\omega)$, where $\eta_F = 4\mu_0 \omega^2 X^{(2)}$ is the nonlinear constant of the monolayer and $X^{(2)}$ is the second order nonlinear susceptibility in the plane of the material. To account for the resonant enhancement effect in the FP cavity for the fundamental wave, the field enhancement factor for the fundamental wave is defined as the ratio of the fundamental electric field $E_F(\omega)$ built up at the $MoS_2$ monolayer to the incident field $A_0(\omega)$ from outside the cavity: $\eta_\omega = E_F(\omega)/A_0(\omega)$. FIG. 4C shows the calculated intensity enhancement factor of the fundamental wave (defined as $|\eta_\omega|^2$) as a function of wavelength and voltage. It can be seen that the resonant wavelengths of the cavity modes can be blue-shifted through voltage tuning while the enhancement factor $|\eta_\omega|^2$ can be tuned up to 30 times. Similar to the fundamental wave, the radiated second harmonic wave also builds up in the resonant cavity. The field enhancement factor $\eta_{2\omega}$ for the second harmonic wave is defined as the ratio of the output electric field $S_0(2\omega)$ at the second harmonic frequency to the radiated second harmonic electric field from the $MoS_2$ flake $S_F(2\omega)$: $\eta_{2\omega} = S_0(\omega)/S_F(\omega)$.

Figure 4D:
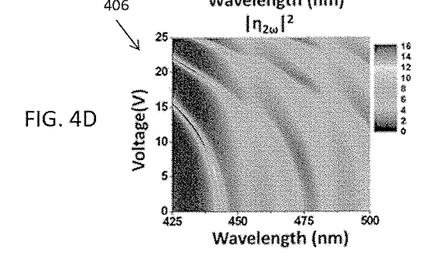

FIG. 4D shows that the intensity enhancement factor for the second harmonic wave $|\eta_{2\omega}|^2$ can also be tuned by changing the cavity length. The total power enhancement factor by the cavity is then characterized by $|\eta_{2\omega}|^2 \times |\eta_\omega|^4$. Since the intracavity power is proportional to the quality factor, this result is consistent with calculations from coupled mode theory for doubly resonant cavities under critical coupling conditions. In this case the nonlinear output power scales with $(Q_\omega)^2 \times (Q_{2\omega})$, where $Q_\omega$ and $Q_{2\omega}$ are the quality factors for the fundamental and second harmonic waves, respectively. The TMM calculation predicts that the total second harmonic output power can be enhanced above 3,500 times through voltage tuning the cavity to attain double resonance. This maximum enhancement corresponds to the case where both the fundamental and second harmonic waves are spectrally tuned with two cavity modes, i.e. double resonance condition.

The nonlinear conversion efficiency of the fabricated device was experimentally characterized. For excitation, transform limited pulses with a duration of 140 fs were used. For different tuning voltages, the pulse center wavelength in the 850 nm-1000 nm window corresponding to the region where the micro FP cavity supports fundamental wave resonances was scanned. This allows mapping of the overall optomechanical power enhancement factor of SHG that is the ratio between SHG signals from a $MoS_2$ monolayer in cavity device disclosed herein and from a typical $MoS_2$ monolayer on a glass, as shown in FIG. 5A.

For a pump wavelength of 925 nm and a tuning voltage of 17 V the measured maximum enhancement is 3,300 times larger than the SHG from a monolayer on a glass substrate. This set of parameters corresponds to the doubly resonant cavity case as shown in FIG. 5B, where the fundamental and second harmonic wavelengths overlap spectrally with two separate cavity resonances. It can be seen that the traces for cavity resonances near the fundamental and second harmonic frequencies intersect in that region when a 17 V tuning bias is applied unlike the mismatched case for 0 V. This is reminiscent of phase matching for co-propagating beams in bulk birefringent nonlinear materials. For other combinations of tuning voltage and fundamental wavelength the nonlinear enhancement is not significant. Singly resonant coupling is also observed when only the fundamental wavelength is resonant with M1 and the second harmonic wavelength is spectrally mismatched from a cavity mode. Similarly, when the fundamental wavelength follows M2, the enhancement is 30× weaker due to lack of a double resonance condition.

The absolute conversion efficiency ($P_{2\omega}/P_{\omega}^2$) of the second harmonic generation was also characterized. FIG. 5C shows the evolution of the optical spectrum of the second harmonic wave as a function of the tuning voltage. The output SHG peak wavelength can be tuned slightly by voltage since the cavity modes are spectrally narrower than the incident fundamental pulse width. The nonlinear device configuration as disclosed herein also allows for dynamical control of the output of this frequency doubler with voltage. FIG. 5D plots the voltage dependence of the measured power conversion efficiency and enhancement factor when the fundamental wave is fixed at 930 nm.

On the contrary, the light-matter interactions in this device can be completely turned off by an applied voltage that detunes the fundamental cavity resonance from the pump. This enables the full optomechanical control of the SHG output intensity for a given input wavelength and optical power. Also, the SHG signal is switched from ON state at 20V to completely OFF state at 22.5V, indicating the very efficient tuning capability of the cavity disclosed herein (40% per volt). Due to the capacitive nature, this frequency doubler will not consume any energy for switching operations. The inset 530 in FIG. 5D shows the SHG output power as a function of the input pump power for the double resonance condition from which the power conversion efficiency was calculated to be $1.62 \times 10^{-8}$/W, which is 5000 larger than reported value measured from $MoS_2$ flake on a $Si/SiO_2$ (280 nm) substrate. The measured modulation cutoff frequency for this proof-of-concept-device was 200 Hz limited by the driving electronics. These devices can be modulated resonantly at much higher frequencies if driven at one of the acoustic resonances supported by the membrane mirror.

An example of the disclosed device preparation is described below. The distributed Bragg reflector (DBR) was fabricated by plasma-enhanced chemical vapor deposition (PECVD, Oxford PlasmaLab 100) on a glass slide, after 10 min sonication cleaning in acetone and IPA. Layer stacking of DBR first consist of eight pairs of 130 nm SiNx/130 nm SiOx thin film deposition. Then a layer of ~50 nm indium tin oxide (ITO) was deposited on top as-fabricated DBR structure by DC magnetron sputtering (Explorer 14) under 5 mTorr at 450 W, with Ar:O2 ratio as 100:3.

The refractive indices of the ITO and the PECVD SiNx and SiOx thin films are characterized using Filmmetrics F40. A 1.5 μm thick SU-8 layer is then spin-coated and patterned on top of the ITO layer as the spacer. A commercially available silicon nitride window with 100 nm thick membrane bonded on top of the SU-8 spacer through commercially available adhesive (cyanoacrylate). The backside of the membrane is pre-coated with a 50 nm of silver layer at the backmirror through e-beam evaporation. Electrical contacts to the MEMs capacitor are through the silver layer and the ITO layer respectively.

$MoS_2$ Growth. Single crystal $MoS_2$ flakes were grown directly on a 300 nm $SiO_2$/Si substrate by chemical vapor deposition. A 1% sodium cholate solution is initially spin coated onto the $SiO_2$ substrate to help promote a growth region. A microdroplet of a saturated solution of ammonium heptamolybate (AHM) is deposited onto the corner of the substrate. The AHM acts as the molybdenum feedstock. The substrate is placed in the center of a 1 in. Lindberg blue furnace and 25 mg of solid sulfur (part number 213292, Sigma-Aldrich) is placed upstream at a distance of 18 cm from the growth substrate. Nitrogen at 700 sccm is flown through the chamber and the temperature of the furnace is ramped up to 800 C; the sulfur pellet is heated up to 150° C. After a 30 min growth, the furnace is then stopped and rapidly cooled to room temperature. The growth substrate is retrieved and $MoS_2$ flakes were grown across the $SiO_2$ substrate.

A femtosecond-pulsed Ti:sapphire laser (Chameleon), tuned from 680 nm to 1,000 nm with ~140 fs pulse width and 80 MHz repetition rate, was focused onto individual flakes through the DBR mirror by means of a home-built microscope equipped with a ×10, 0.25 NA objective (Nikon). The average excitation power of ~2 mW (FW) was used to excite SHG from the $MoS_2$ flakes. The SHG signals were imaged by a cooled charge-coupled device and measured by a spectrometer (Acton) with a spectral resolution of 0.1 nm. The external normalized conversion efficiency is defined as $P_{2\omega}/P_{\omega}·2$ where $P_{\omega}$ is the peak power of FW illuminated upon the DBR mirror while $P_{2\omega}$ is the peak power of generated SHW coming out from the cavity. The reported conversion efficiency (e.g. $1.68 \times 10^{-8}$/W) has considered the system collection efficiency, including transmission/reflection coefficient of each optical elements. The measured power enhancement factor is defined as the SH power from the cavity normalized to the SH power from the $MoS_2$ monolayer on a glass substrate.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. An optomechanical device for frequency doubling enhancement, comprising:
    a substrate through which light of a first wavelength is introduced;
    a first reflector mirror positioned on the substrate;
    a conductive layer disposed on the first reflector mirror;
    a second mirror spaced apart from the conductive layer, thereby forming an optical cavity between the second mirror and the conductive layer;
    a power source coupled to the second mirror and the conductive layer; and
    a monolayer of non-linear optical material disposed within the optical cavity, the monolayer configured to produce light of a second wavelength upon interaction with the light of the first wavelength,
    wherein the second mirror is deformable upon introduction of voltage from the power source to the second mirror, the voltage introduced to the second mirror effecting deformation of the second mirror; and
    wherein the deformation of the second mirror changes a length of the optical cavity, thereby enhancing a power output of the light of the second wavelength produced by the monolayer.

2. The device of claim 1, wherein the monolayer comprises molybdenum disulfide (MoS2).

3. The device of claim 1, wherein the second mirror comprises silver.

4. The device of claim 1, wherein the power output of the light of the second wavelength is enhanced by at least 3,000 times upon deformation of the second mirror.

5. The device of claim 1, wherein the first reflector mirror is a dielectric distributed Bragg reflector mirror.

6. The device of claim 1, wherein the conductive layer comprises indium tin oxide (ITO).

7. The device of claim 1, further comprising at least one layer of photoresist disposed between the conductive layer and the second mirror, the layer of photoresist spacing the second mirror from the conductive layer.

8. The device of claim 7, wherein the layer of photoresist comprises SU-8.

9. A method for optomechanically enhancing frequency doubled light, comprising:
   introducing light of a first wavelength through a substrate and through a first reflector mirror;
   passing the light of the first wavelength through a conductive layer and into an optical cavity formed by a space between the conductive layer and a second deformable mirror, the second deformable mirror being deformable with introduction of a voltage to the second deformable mirror;
   reflecting the light of the first wavelength in the optical cavity to a monolayer of non-linear optical material disposed within the cavity, thereby producing light of a second wavelength;
   deforming the second mirror by applying a voltage to the second mirror, thereby effecting deformation of the second mirror so as to change a length of the optical cavity, thereby enhancing a power output of the light of the second wavelength; and
   outputting the light of the second wavelength.

10. The method of claim 9, wherein the light of the second wavelength is of a frequency that is about double that of a frequency of the light of the first wavelength.

11. The method of claim 9, wherein the monolayer comprises MoS2.

12. The method of claim 9, wherein the second deformable mirror comprises silver.

13. The method of claim 9, wherein the deforming step comprises applying a voltage of about 20 volts to the second mirror.

14. The method of claim 9, wherein the power output of the light of the second wavelength is enhanced by at least 3,000 times.

* * * * *

UNITED STATES PATENT AND TRADEMARK OFFICE
CERTIFICATE OF CORRECTION

PATENT NO. : 10,503,047 B2
APPLICATION NO. : 15/580537
DATED : December 10, 2019
INVENTOR(S) : Cubukcu et al.

It is certified that error appears in the above-identified patent and that said Letters Patent is hereby corrected as shown below:

On the Title Page

Page 2, Column no. 2, Line nos. 11, 12, and 13, Item [56], References Cited, under heading OTHER PUBLICATIONS, Replace:
"Reed et al., "Wavelength Tunable Microdisk Cavity Light Source with a Chemically Enhanced MoS2 Emitter", Nano Letters, 2015, vol. 15, pp. 1967-1971."
With:
--Reed et al., "Wavelength Tunable Microdisk Cavity Light Source with a Chemically Enhanced $MoS_2$ Emitter", Nano Letters, 2015, vol. 15, pp. 1967-1971."--

In the Specification

Under heading Detailed Description of the Invention, Column no. 4, Line no. 7, Replace:
"molybdenum disulfide (MoS2). Monolayers of MoS2 that"
With:
--molybdenum disulfide ($MoS_2$). Monolayers of $MoS_2$ that--

Under heading Detailed Description of the Invention, Column no. 4, Line no. 42, Replace:
"as an MoS2 layer, other suitable materials for the monolayer"
With:
--as an $MoS_2$ layer, other suitable materials for the monolayer--

In the Claims

Under Column no. 9, Claim no. 2, Line no. 2, Replace:
"Comprises molybdenum disulfide (MoS2)."
With:
--Comprises molybdenum disulfide ($MoS_2$).--

Signed and Sealed this
Seventeenth Day of March, 2020

Andrei Iancu
*Director of the United States Patent and Trademark Office*

Under Column no. 10, Claim no. 11, Line no. 16, Replace:
"comprises MoS2."
With:
--comprises $MoS_2$.--